(12) United States Patent
Obermüller et al.

(10) Patent No.: US 11,084,530 B2
(45) Date of Patent: Aug. 10, 2021

(54) METHOD FOR CONTROLLING AT LEAST ONE VEHICLE SYSTEM OF A MOTOR VEHICLE DURING A TRIP, AND DEVICE AND VEHICLE

(71) Applicant: AUDI AG, Ingolstadt (DE)

(72) Inventors: Anton Obermüller, Ingolstadt (DE); Adrian Mihailescu, Ingolstadt (DE); Ferdinand Hartinger, Munich (DE); Klaus Diepold, Kissing (DE); Martin Enning, Ingolstadt (DE); Christian Wiedenmann, Ingolstadt (DE); Michael Ortlechner, Ingolstadt (DE); Matthias Lehmann, Freising (DE)

(73) Assignee: AUDI AG, Ingolstadt (DE)

( * ) Notice: Subject to any disclaimer, the term of this patent is extended or adjusted under 35 U.S.C. 154(b) by 45 days.

(21) Appl. No.: 16/629,290

(22) PCT Filed: Jul. 10, 2018

(86) PCT No.: PCT/EP2018/068653
§ 371 (c)(1),
(2) Date: Jan. 7, 2020

(87) PCT Pub. No.: WO2019/016030
PCT Pub. Date: Jan. 24, 2019

(65) Prior Publication Data
US 2021/0101638 A1 Apr. 8, 2021

(30) Foreign Application Priority Data
Jul. 20, 2017 (DE) .......................... 102017212497.0

(51) Int. Cl.
*B62D 15/02* (2006.01)
*G05D 1/02* (2020.01)

(52) U.S. Cl.
CPC ........... *B62D 15/025* (2013.01); *G05D 1/021* (2013.01); *B62D 15/0255* (2013.01)

(58) Field of Classification Search
CPC .. B62D 15/025; B62D 15/0255; B62D 6/002; B62D 15/0285; B62D 1/286;
(Continued)

(56) References Cited

U.S. PATENT DOCUMENTS

| 9,919,741 B2 | 3/2018 | Kim et al. |
| 10,023,091 B2 * | 7/2018 | Bendewald ............ B60N 3/001 |

(Continued)

FOREIGN PATENT DOCUMENTS

| DE | 102010053156 A1 | 6/2012 |
| DE | 102013013568 A1 | 2/2015 |

(Continued)

OTHER PUBLICATIONS

International Search Report and Written Opinion of the International Searching Authority directed to related International Patent Application No. PCT/EP2018/068653, with attached English-language transation, dated Oct. 26, 2018; 16 pages.

International Preliminary Report on Patentability directed to related International Patent Application No. PCT/EP2018/068653, dated Jan. 21, 2020, with attached English-lnaguage translation; 14 pages.

*Primary Examiner* — Rodney A Butler
(74) *Attorney, Agent, or Firm* — Sterne, Kessler, Goldstein & Fox P.L.L.C.

(57) ABSTRACT

The disclosure relates to a method, a device and a motor vehicle for controlling at least one vehicle system of the motor vehicle during a drive, wherein each vehicle system is respectively adapted to perform a driving maneuver of the motor vehicle and for each vehicle system a control responsibility determines, in which proportion a driver and a driver assistance system of the motor vehicle each controls the vehicle system, the method comprising the steps of: providing an assignment specification with which a control respon-
(Continued)

sibility is assigned for different driving situations in each case for each vehicle system; identifying an instantaneous driving situation while driving and determining the respectively assigned control responsibility in each vehicle system according to the assignment specification; receiving control instructions from the driver and from the driver assistance system for each vehicle system; and for each vehicle system, superposing control instructions from the driver and from the driver assistance system intended for said vehicle system in accordance with the control responsibility.

10 Claims, 2 Drawing Sheets

(58) Field of Classification Search
CPC ............ G05D 1/021; B60K 2370/175; B60W 2555/00; B60W 2050/0091; B60W 2540/10; B60W 2540/12; B60W 2540/18; B60W 50/08
See application file for complete search history.

(56) References Cited

U.S. PATENT DOCUMENTS

| | | |
|---|---|---|
| 2001/0054519 A1 | 12/2001 | Nishiwaki et al. |
| 2012/0197496 A1 | 8/2012 | Limpibunterng et al. |
| 2012/0303217 A1 | 11/2012 | Reichel et al. |
| 2014/0244069 A1* | 8/2014 | Yang .................. B60R 16/0231 701/1 |
| 2016/0176440 A1 | 6/2016 | Witte et al. |
| 2016/0325741 A1 | 11/2016 | Furst |

FOREIGN PATENT DOCUMENTS

| | | |
|---|---|---|
| DE | 102013017212 A1 | 4/2015 |
| DE | 102014002540 A1 | 8/2015 |
| DE | 102014226781 A1 | 6/2016 |
| DE | 102015004745 A1 | 10/2016 |
| DE | 112010003977 B4 | 5/2017 |
| EP | 2316708 A1 | 5/2011 |
| EP | 3141443 A1 | 3/2017 |

* cited by examiner

METHOD FOR CONTROLLING AT LEAST ONE VEHICLE SYSTEM OF A MOTOR VEHICLE DURING A TRIP, AND DEVICE AND VEHICLE

TECHNICAL FIELD

The disclosure relates to a method for controlling at least one vehicle system of a motor vehicle during a drive.

BACKGROUND

A modern vehicle, in particular, a motor vehicle, may include a driver assistance system, which assumes more and more driving tasks of the driver—up to and including a complete assumption of all driving tasks. A driving task in this case may include, for example, one of the following activities: specifying a steering angle, specifying an acceleration and/or a speed, specifying a deceleration, i.e., a negative acceleration, adjusting the suspension damping. In a conventional vehicle, the driver was previously responsible for a driver's request, i.e., the driver determines, in particular, by means of driving maneuvers, where the vehicle should be steered, and thus has control responsibility. The driver transmits his driver's request as a control instruction by means of a human-machine interface such as, for example, steering wheel, accelerator pedal and/or brake pedal, to at least one of the vehicle systems of the vehicle. Whereupon the at least one vehicle system responds to the information regarding the control instruction obtained via the human-machine interface and evaluates it in order to generate or to deduce its own behavior, functions and/or supports. Such a vehicle system may be, for example, a steering system, a chassis, a braking system or a lighting system.

For example, the driver of the motor vehicle may transmit his control instruction by operating the steering handle, whereupon the steering system adapts its behavior in accordance with the control instruction in such a way that, for example, a manual torque of the steering handle is increased. The lighting system, in response to the same input by the driver, may pivot headlights in the direction of movement of the steering handle moved by the driver. In the case of the brake, the motor vehicle may be stabilized by a reciprocal braking intervention, for example, in the event of a break-out of the motor vehicle. The control responsibility in conventional vehicles, especially passenger cars, is always that of the driver.

With the use of semi-autonomous and/or autonomous driver assistance systems, the clear responsibility of the driver for providing the control instructions disappears, which may result in a superposition of control instructions from the driver and from the driver assistance system.

In other words, the control responsibility is no longer that of the driver alone, rather the driver assistance system may assume the control responsibility for at least one vehicle system. A shared, simultaneous or proportionate control responsibility may also result. This may result in a vehicle system no longer being able to clearly allocate what the control instruction from the driver or the control instruction from the driver assistance system is in a specific driving situation, or whether the driver or the driver assistance system controls the vehicle. This results in implausible driving conditions and limits the functionality of the vehicle system.

If, for example, the vehicle system is a dynamic steering system, which is able to transmit an active angle superposition, for example, to the front axle of the vehicle, it is necessary to specify a steering angle for a steering behavior. In the event that the control responsibility is that of the driver and the driver thus steers the motor vehicle, the driver specifies an actuating steering angle of the steering handle, which is read in by a control logic of the dynamic steering and on which a, in particular calculated, superposition angle is superposed. A cumulative angle of the steering wheel angle entered by the driver (corresponds to the actuating steering angle of the steering handle) and of the superposition angle is then provided via an electronic power steering (EPS), i.e., transmitted to the wheels of the front axle.

In the event that the driver assistance system controls the vehicle, the driver assistance system assumes the specification of a trajectory request or of the control instruction and sets this directly via the electronic power steering. With the resulting change in an electronic power steering angle, i.e., the angle of the wheels of the front axle, the steering handle, in particular, the steering wheel, also rotates via a mechanical coupling. In turn, the dynamic steering responds by superposing a superposition angle. However, the resulting target angle then cannot be set via the electronic power steering, since it is blocked by the driver assistance system. The dynamic steering does not detect the blockage of the electronic power steering, nor also that the target angle can not be achieved, and readjusts the steering wheel to the positioning of the wheels presumably carried out by the electronic power steering, which may result in undesirable feedback. The dynamic steering then again detects a change in the actuating control angle of the steering handle and then changes the superposition angle.

In other words, in the case of dynamic steering, the tracking of the steering wheel may thus result in an unstable feedback. With the intervention of the electronic power steering, the steering wheel angle (actuating steering angle) changes, whereby the dynamic steering responds to the change in the steering wheel angle by changing its superposition angle and also imprinting it on the steering wheel angle. As a result of this superposition angle, the steering wheel is then rotated further, since the steering wheel is to be tracked, wherein the vehicle system then again detects the change of the steering wheel and responds again, allowing the steering wheel to rotate undesirably further.

DE 10 2015 004 745 A1 discloses a method for operating a motor vehicle, comprising a steering wheel and a lateral control device, which controls a steering angle of a wheel of the motor vehicle, wherein in an autonomous operating mode, the steering wheel is decoupled, wherein in the autonomous operating mode, upon intervention by the lateral control device, the steering angle of the wheel is indicated by means of an actuator triggering a rotational movement of the steering wheel.

DE 10 2010 053 156 A1 discloses a method for operating a motor vehicle, wherein an object in the surroundings of the motor vehicle is detected by means of a surroundings detection device. An assessment of a risk of collision of the motor vehicle with the detected object takes place. Depending on the assessment of the risk of collision, the steering angle of the motor vehicle may be set by means of a steering angle setting device, wherein a decoupling of the steering wheel of the motor vehicle is implemented by means of a decoupling device, so that the rotational movement of the steering wheel is less due to the adjustment of the steering angle than if the same adjustment were to occur with a non-decoupled steering wheel.

Furthermore, EP 3 141 443 A1 discloses an autonomously driving vehicle, which is able to switch between an autonomous and a manual driving state, whereby a coupling of the steering wheel may be disengaged as a result.

DETAILED DESCRIPTION

Figure 1:
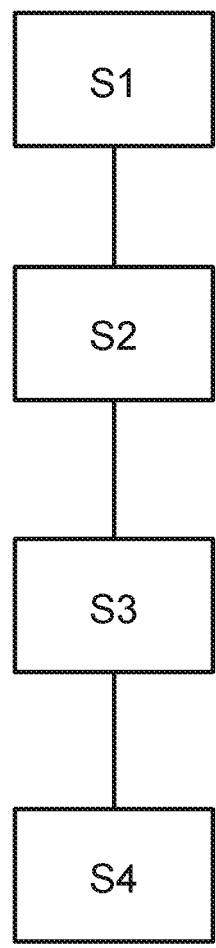
FIG. 1 shows a flow chart for the method according to the disclosure.

The disclosure relates to a method for controlling at least one vehicle system of a motor vehicle during a drive, wherein each vehicle system is configured in each case to perform a driving maneuver of the motor vehicle, and for each vehicle system a control responsibility determines in which proportion a driver or a driver assistance system of the motor vehicle each controls the vehicle system.

A modern vehicle, in particular, a motor vehicle, may include a driver assistance system, which assumes more and more driving tasks of the driver—up to and including a complete assumption of all driving tasks. A driving task in this case may include, for example, one of the following activities: specifying a steering angle, specifying an acceleration and/or a speed, specifying a deceleration, i.e., a negative acceleration, adjusting the suspension damping. In a conventional vehicle, the driver was previously responsible for a driver's request, i.e., the driver determines, in particular, by means of driving maneuvers, where the vehicle should be steered, and thus has control responsibility. The driver transmits his driver's request as a control instruction by means of a human-machine interface such as, for example, steering wheel, accelerator pedal and/or brake pedal, to at least one of the vehicle systems of the vehicle. Whereupon the at least one vehicle system responds to the information regarding the control instruction obtained via the human-machine interface and evaluates it in order to generate or to deduce its own behavior, functions and/or supports. Such a vehicle system may be, for example, a steering system, a chassis, a braking system or a lighting system.

For example, the driver of the motor vehicle may transmit his control instruction by operating the steering handle, whereupon the steering system adapts its behavior in accordance with the control instruction in such a way that, for example, a manual torque of the steering handle is increased. The lighting system, in response to the same input by the driver, may pivot headlights in the direction of movement of the steering handle moved by the driver. In the case of the brake, the motor vehicle may be stabilized by a reciprocal braking intervention, for example, in the event of a breakout of the motor vehicle. The control responsibility in conventional vehicles, especially passenger cars, is always that of the driver.

With the use of semi-autonomous and/or autonomous driver assistance systems, the clear responsibility of the driver for providing the control instructions disappears, which may result in a superposition of control instructions from the driver and from the driver assistance system.

In other words, the control responsibility is no longer that of the driver alone, rather the driver assistance system may assume the control responsibility for at least one vehicle system. A shared, simultaneous or proportionate control responsibility may also result. This may result in a vehicle system no longer being able to clearly allocate what the control instruction from the driver or the control instruction from the driver assistance system is in a specific driving situation, or whether the driver or the driver assistance system controls the vehicle. This results in implausible driving conditions and limits the functionality of the vehicle system.

If, for example, the vehicle system is a dynamic steering system, which is able to transmit an active angle superposition, for example, to the front axle of the vehicle, it is necessary to specify a steering angle for a steering behavior. In the event that the control responsibility is that of the driver and the driver thus steers the motor vehicle, the driver specifies an actuating steering angle of the steering handle, which is read in by a control logic of the dynamic steering and on which a, in particular calculated, superposition angle is superposed. A cumulative angle of the steering wheel angle entered by the driver (corresponds to the actuating steering angle of the steering handle) and of the superposition angle is then provided via an electronic power steering (EPS), i.e., transmitted to the wheels of the front axle.

In the event that the driver assistance system controls the vehicle, the driver assistance system assumes the specification of a trajectory request or of the control instruction and sets this directly via the electronic power steering. With the resulting change in an electronic power steering angle, i.e., the angle of the wheels of the front axle, the steering handle, in particular, the steering wheel, also rotates via a mechanical coupling. In turn, the dynamic steering responds by superposing a superposition angle. However, the resulting target angle then cannot be set via the electronic power steering, since it is blocked by the driver assistance system. The dynamic steering does not detect the blockage of the electronic power steering, nor also that the target angle can not be achieved, and readjusts the steering wheel to the positioning of the wheels presumably carried out by the electronic power steering, which may result in undesirable feedback. The dynamic steering then again detects a change in the actuating control angle of the steering handle and then changes the superposition angle.

In other words, in the case of dynamic steering, the tracking of the steering wheel may thus result in an unstable feedback. With the intervention of the electronic power steering, the steering wheel angle (actuating steering angle) changes, whereby the dynamic steering responds to the change in the steering wheel angle by changing its superposition angle and also imprinting it on the steering wheel angle. As a result of this superposition angle, the steering wheel is then rotated further, since the steering wheel is to be tracked, wherein the vehicle system then again detects the change of the steering wheel and responds again, allowing the steering wheel to rotate undesirably further.

DE 10 2015 004 745 A1 discloses a method for operating a motor vehicle, comprising a steering wheel and a lateral control device, which controls a steering angle of a wheel of the motor vehicle, wherein in an autonomous operating mode, the steering wheel is decoupled, wherein in the autonomous operating mode, upon intervention by the lateral control device, the steering angle of the wheel is indicated by means of an actuator triggering a rotational movement of the steering wheel.

DE 10 2010 053 156 A1 discloses a method for operating a motor vehicle, wherein an object in the surroundings of the motor vehicle is detected by means of a surroundings detection device. An assessment of a risk of collision of the motor vehicle with the detected object takes place. Depending on the assessment of the risk of collision, the steering angle of the motor vehicle may be set by means of a steering angle setting device, wherein a decoupling of the steering wheel of the motor vehicle is implemented by means of a decoupling device, so that the rotational movement of the steering wheel is less due to the adjustment of the steering angle than if the same adjustment were to occur with a non-decoupled steering wheel.

Furthermore, EP 3 141 443 A1 discloses an autonomously driving vehicle, which is able to switch between an autonomous and a manual driving state, whereby a coupling of the steering wheel may be disengaged as a result.

The object of the present disclosure is therefore to provide a way by which at least one vehicle system of a motor vehicle is operable in such a way that feedbacks of the vehicle system may be precluded due to a lack of assignability of control instructions.

The object is achieved by the subject matters of the independent claims. Advantageous refinements of the disclosure are described by means of the dependent claims, the following description and the drawings.

The disclosure provides a method for controlling at least one vehicle system of a motor vehicle during a drive, wherein each vehicle system is adapted in each case to perform a driving maneuver of the motor vehicle and a control responsibility for each vehicle system is determined.

A driving maneuver is to be understood, for example, as steering, braking and/or accelerating and/or influencing the chassis damping. The control responsibility may represent a measure of the proportion in which a driver and a driver assistance system of the motor vehicle each controls the vehicle system. In this case, the proportion for both sides may, in principle, be between 0% and 100%, the proportions together preferably totaling 100%. The method is characterized by the following steps:

In order to carry out the control of the vehicle system in a particularly advantageous manner and, for example, without feedback, an assignment specification is provided in a first step, by means of which a control responsibility is assigned to different driving situations in each case for each vehicle system. In a second step, an instanteous driving situation during the drive is identified, and the respectively assigned control responsibility for each vehicle system is determined in accordance with the assignment specification. In a further step, control instructions from the driver and from the driver assistance system for each vehicle system are received. The control instructions from the driver and the control instructions from the driver assistance system determined for a respective vehicle system are superposed in a further step for each vehicle system in accordance with the control responsibility.

In other words, it must be determined in the motor vehicle for which driving task the driver and for which driving task the driver assistance system is responsible, and thus which vehicle system is to be controlled by whom. The assignment of the control responsibility takes place via the method according to the disclosure, for which purpose an assignment specification is provided in the first step. The assignment specification determines in which driving situation the driver and/or the driver assistance system is responsible for the control of a vehicle system.

A simple example of an assignment specification may be that, starting at a certain speed, the driver assistance system is switched off or is already switched off, so that the control responsibility is with virtual certainty that of the driver. Another example may be that the driving situation requires automatically maintaining a distance, whereby the brake and accelerator are controlled by the driver assistance system.

By means of a sensor system, for example, it is recognized in a second step of the method according to the disclosure in which instantaneous driving situation the motor vehicle is situated while driving and, in accordance with the previously provided assignment specification, a respectively assigned control responsibility is assigned to each vehicle system.

By means of the two last-mentioned method steps, the motor vehicle or the respective vehicle system "knows" by whom, i.e., the driver and/or the driver assistance system, it is being controlled. In a further step of the method, control instructions are received by the respective driver or driver assistance system having control responsibility, so that the control instructions may be unambiguously assigned, for example. These received control instructions are superposed for each of the vehicle systems, so that the vehicle system obeys the correct control instruction.

A superposition in this case means that the at least one vehicle system may be in a state, in which both the driver as well as the driver assistance system have a control responsibility of the vehicle system. This may be the case, for example, in a change from autonomous to manual driving mode, where, for example, a steering is transferred slowly and, thus, the driving proportion for the driver transitions from 0% to 100%, while that for the driver assistance system falls from 100% to 0%. Other examples of a superposition are an emergency evasion of the driver assistance system or an automatic overtaking on, for example, a highway, in which a lane change is performed automatically by the autonomous driver assistant, even though the driver is steering the motor vehicle.

In one refinement of the disclosure, it is provided that the respectively assigned control responsibility is determined decentrally, so that only the control instruction from the driver or the control instruction from the driver assistance system is carried out by the vehicle system. In other words, the control responsibility is not, for example, transmitted from a central, electronic computing device, but for example, the determination takes place in the respective vehicle system itself. This yields the advantage that a networking of the respective vehicle systems with one another and/or with the central computing device may be omitted, as a result of which the method may be carried out, for example, in a fail-safe manner.

In another embodiment of the disclosure, it is provided that the respectively assigned control responsibility is determined centrally, so that the control instruction from the driver and the control instruction from the driver assistance system are transmitted to the vehicle system as a superposed control instruction. This means that the method is carried out in such a way that a central entity, for example the electronic computing device, centrally assigns the respective control responsibility to the respective vehicle systems. As a result, for example, a superposition of control instructions from the driver and from the driver assistance system is particularly easy to implement. An arbitrary mixture, i.e., a superposition state, may thus result from the driver's request or from the control instruction from the driver or from the control instruction from the driver assistance system.

In another embodiment of the disclosure, the method is characterized in that the at least one vehicle system implements its function independently of the control responsibility. In other words, the vehicle system fulfills its assigned function, for example, setting a steering angle of the wheels, regardless of the control responsibility, that is, regardless of whether the driver and/or the driver assistance system issues/issue the control instructions to the vehicle system. In this way the vehicle system may be precluded from not responding to control instructions.

In another refinement, it is provided that at least one of the vehicle systems represents an active steering system. In other words, one of the vehicle systems is designed to assume lateral control tasks, in which it may apply, for example, an additional steering torque in the steering system. An active steering system, also referred to as dynamic steering, makes a particularly high integration of at least one driver assistance system in a motor vehicle possible.

In another refinement, it is provided that, when controlling the superposition, at least one target steering angle of the steering system is calculated. During superposition, in particular in the superposition steering, an angle, for example, of the driver assistance system is superposed on a steering wheel angle, that is, a rotation angle at the input of a steering gear does not correspond to the steering wheel angle. As a result of the at least one calculated target steering angle, the motor vehicle may be steered on, for example, an intended path, if, for example, the aim of the driver assistance system is to regulate the motor vehicle in such a way that it moves along a middle lane of a roadway.

In one refinement, it is provided that the driver assistance system generates autonomous and/or semi-autonomous driving instructions. In other words, the motor vehicle is capable of self-parking given at least semi-autonomous driving instructions. Because the motor vehicle is able to generate at least partially autonomous driving instructions, the driver is relieved, at least for certain driving situations, in which a partially autonomous operation of the motor vehicle is possible. As a result, the driver may, for example, stay focused longer, which may result in a reduction of critical driving situations due to carelessness of the driver.

In another refinement, it is provided that a human-machine interface of the vehicle system is adapted when the control responsibility for the vehicle is transferred to the driver. Thus, for example, in the case of steering, the handle, i.e., the steering wheel, is tracked accordingly, so that the corresponding human-machine interface, the steering wheel, is in a position in which the steering wheel would be if the control responsibility were already with the driver. This has the advantage that when switching to manual operation, in which the driver drives the motor vehicle, all controls of the human-machine interface are in the position in which they are expected by the driver and thus, for example, an abrupt handover or the like may be avoided.

The disclosure also includes refinements of the device according to the disclosure and of the motor vehicle according to the disclosure, which have features as were previously described in conjunction with the refinements of the method according to the disclosure. For this reason, the corresponding refinements of the device according to the disclosure and of the motor vehicle according to the disclosure are not described again herein.

Exemplary embodiments of the disclosure are described below.

FIG. 1 shows a flow chart for the method according to the.

Figure 2:
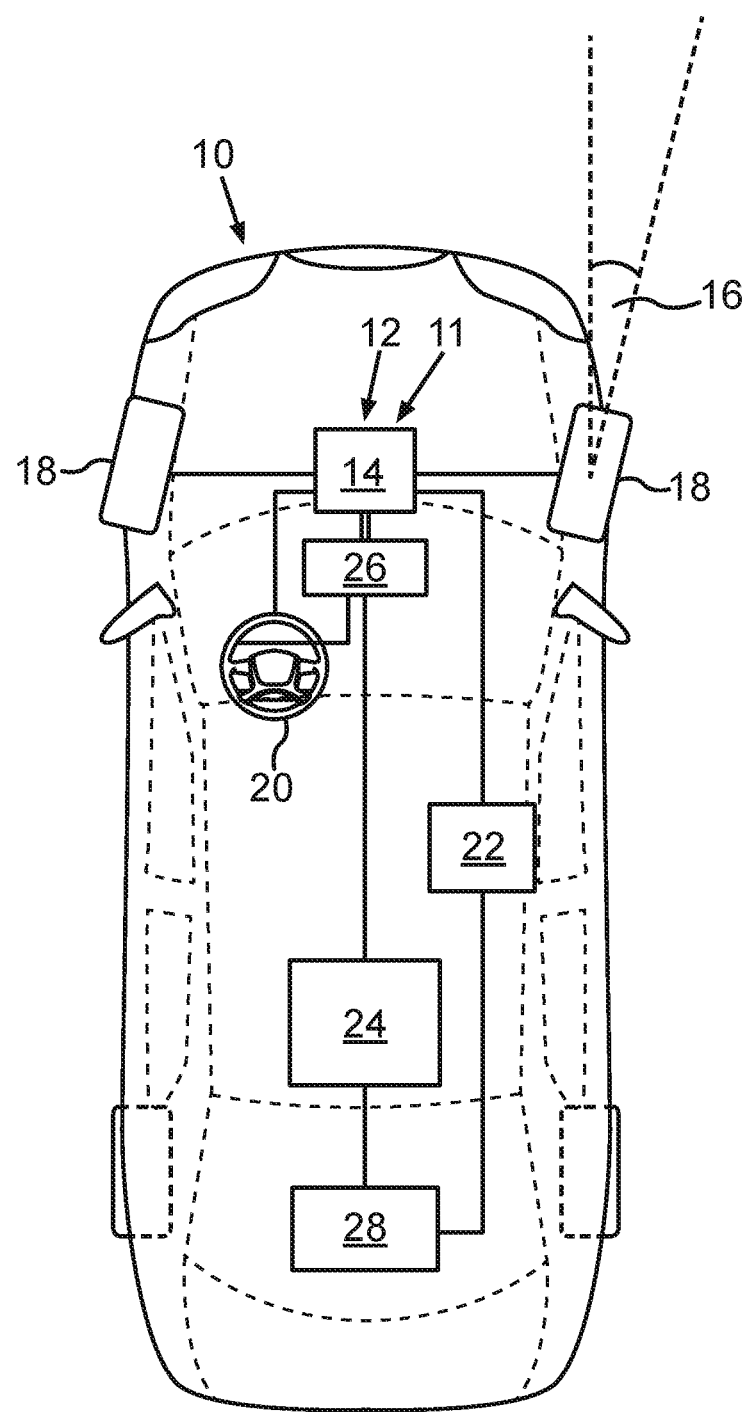
FIG. 2 shows a schematic top view of a motor vehicle, which includings a device by means of which the method may be carried out.

FIG. 2 shows a schematic top view of a motor vehicle, which includugs a device by means of which the method may be carried out.

The exemplary embodiments explained below are preferred embodiments of the disclosure. In the exemplary embodiments, the components of the embodiments described each constitute individual features of the disclosure to be considered separately from one another, which also refine the disclosure, in each case separately from one another, and are therefore also to be considered part of the disclosure both separately and in a combination apart from the combination shown. In addition, the embodiments described may also be supplemented by additional features of the disclosure, which have already been described.

In the drawings, functionally identical elements are provided with the same reference numerals.

FIG. 1 shows a flowchart for a method for controlling at least one vehicle system 12 of a motor vehicle 10 during a drive, wherein the at least one vehicle system 12 is configured to perform a driving maneuver of the motor vehicle 10. In addition, a control responsibility for the at least one vehicle system 12 is determined using the method, for which proportion a driver and a driver assistance system 22 of the motor vehicle 10 each control the vehicle system 12.

The method comprises steps S1 to S4. In the first step S1, an assignment specification is provided by the method, by means of which a control responsibility is assigned for different driving situations for each vehicle system 12, respectively. In the second step S2, an instantaneous driving situation during the drive of the motor vehicle 10 is identified by the method and, in addition, a respective control responsibility is assigned or determined according to the assignment specification for the respective vehicle system 12.

This determination clarifies whether the driver or the driver assistance system 22 is responsible for the respective vehicle system 12, or whether they are allowed to control the respective vehicle system 12. In the third step S3, control instructions from the driver and from the driver assistance system 22 are received for each vehicle system 12. That is, control inputs, which the driver enters at a suitable human-machine interface while having the control responsibility for the vehicle system 12, are received by means of the method, to then be relayed as a control instruction to the vehicle system 12 and converted by the vehicle system into a driving maneuver. The same applies to the receiving and relaying of control instructions of the driver assistance system 22, if the driver assistance system has received at least in part the control responsibility for a corresponding vehicle system 12. In a fourth step S4, the received control instructions from the driver and from the driver assistance system 22 are superposed for each vehicle system 12 according to the control responsibility. This superposition may be necessary because, for example, both the driver as well as the driver assistance system 22 each share a portion of the control responsibility for a vehicle system 12 such as, for example, the brakes.

The method just described is explained with reference to the motor vehicle 10 shown in FIG. 2 by way of example with reference to an active steering system 11, which represents a vehicle system 12. The active steering system 11 may also be referred to as dynamic steering.

The active steering system 11 has a lateral control device 14, which is able to set a wheel angle 16 of the front wheel 18 or of the front wheels 18. For this purpose, the lateral control device 14 receives a control instruction provided by the human-machine interface designed as a steering wheel 20, or by the driver assistance system 22. The motor vehicle 10 also includes a device 24 for carrying out the method.

In the event the driver has the control responsibility of the vehicle system 12, i.e., of the active steering system 11, the driver specifies a steering wheel angle by means of the steering wheel 20. This steering wheel angle is transmitted to the lateral control device 14, which may be at least partially designed as electronic power steering.

In the event the driver assistance system 22 has the control responsibility over the active steering system 11 and thus over the vehicle system 12, the driver assistance system 22 specifies the driving instructions, wherein the wheel angle 16 on the wheels 18 is then set via the lateral control device 14.

In one case, the respectively assigned control responsibility may be determined decentrally, so that only the control instruction from the driver or the control instruction from the driver assistance system 22 is transmitted to the vehicle system 12, i.e., to the active steering system 11. In a second case, the respectively assigned control responsibility may be determined centrally, for example, by means of a control device 26, so that the control instruction from the driver and the control instruction from the driver assistance system 22 are transmitted to the vehicle system 12 as a superposed control instruction.

The steps S1 to S4 are carried out in this case by the device 24, for example. In this case, an assignment specification is given, for example, to the effect that, starting at a certain speed, the driver assistance system 22 is no longer responsible and/or, if a brake pedal is pressed too hard, the driver assistance system 22 autonomously assumes control. For this purpose, the driving situation may be identified, for example, by monitoring, for example, the brake, and a control responsibility may be assigned as a result.

The motor vehicle 10 may, for example, have a surroundings detection device in the form of a sensor 28, in order, for example, to avoid an obstacle. If the device 24 receives control instructions for the vehicle system 12 from the driver and from the driver assistance system 22, it is possible, for example by means of the activation device 26, to switch between a control variable, i.e., a state "driver is driving" and a state "driver assistance system 22 is driving." A target steering wheel angle for the driver and a target steering wheel angle for the driver assistance system 22 may be calculated by the control device 26 of the active steering system 11. One or the other target steering wheel angle is used depending on a classification of the state "driver is driving" or "driver assistance system is driving." For the central case, a consolidated target angle is calculated, which corresponds to or may regulate a handover or a transition between the two states "driver is driving" and "driver assistance system is driving." In the central approach, a switching of the respective control responsibility may be avoided or reduced. Thus, the vehicle system 12 may implement its function, in the example shown, the steering of the wheels 18, independently of the control responsibility of the driver or of the driver assistance system, and may avoid negative effects such as, for example, feedback of the active steering system 11 or of the dynamic steering.

In addition, it is possible with the method when transferring control responsibility for the vehicle system 12 from the driver assistance system 22 to the driver, to track the human-machine interface, here the steering wheel 20, which is necessary, for example, during piloted driving. If the motor vehicle 10 is driving autonomously, the steering wheel 20 may be held in the rest position by the active steering system 11, which would correspond to a steering wheel angle of 0°, in order to allow the driver, for example, to read a newspaper. When the driver assumes control responsibility, the steering wheel 20 must be moved back to a target position, i.e., the steering wheel must be tracked. The specific application just mentioned may also be implemented by the method.

On the whole, the examples show how a safe operation of at least one vehicle system 12 is possible with the disclosure, since the method shown provides the possibility of distinguishing between a respective control responsibility of the driver and of the driver assistance system 22.

The invention claimed is:

1. A method of controlling a vehicle system of a motor vehicle during a drive, wherein the vehicle system is configured to perform a driving maneuver of the motor vehicle, the method comprising:
   providing an assignment specification that specifies a first control responsibility and a second control responsibility that are assigned to a first driving situation and a second driving situation for the vehicle system respectively, wherein the first control responsibility determines that control instructions from a drive and from a driver assistance system control the motor vehicle by a first portion and a second portion respectively;
   identifying an instantaneous driving situation corresponding to the first driving situation while driving;
   determining the first control responsibility in the vehicle system based on the assignment specification;
   receiving control instructions from the driver and from the driver assistance system for the vehicle system; and
   superposing control instructions from the driver and from the driver assistance system intended for the vehicle system in accordance with the first control responsibility.

2. The method according to claim 1, wherein the first control responsibility is determined decentrally on the vehicle system, so that the control instructions from the driver or the control instructions from the driver assistance system are carried out by the vehicle system.

3. The method according to claim 1, wherein the first control responsibility is determined centrally, so that the control instructions from the driver and the control instructions from the driver assistance system are transmitted to the vehicle system as a superposed control instruction.

4. The method according to claim 1, wherein the vehicle system performs the driving maneuver of the motor vehicle independently of the first control responsibility and the second control responsibility, so that the driving maneuver occurs regardless of a source of the control instructions.

5. The method according to claim 1, wherein the vehicle system constitutes an active steering system.

6. The method according to claim 5, further comprising:
   calculating a target steering angle of the active steering system; and
   controlling a superposition in the active steering system based on the target steering angle.

7. The method according to claim 1, wherein the control instructions from the driver assistance system are generated as autonomous or semi-autonomous driving instructions.

8. The method according to claim 1, further comprising adapting a human-machine interface of the vehicle system when the first control responsibility is determined and the first portion is 100% such that a control of the vehicle system is transferred to a driver.

9. A device of a motor vehicle configured to perform a driving maneuver of the motor vehicle, wherein the device is configured to:
   provide an assignment specification that specifies a first control responsibility and a second control responsibility that are assigned to a first driving situation and a second driving situation for the device respectively, wherein the first control responsibility determines that control instructions from a drive and from a driver assistance system control the motor vehicle by a first portion and a second portion respectively;
   identify an instantaneous driving situation corresponding to the first driving situation while driving;

determine the first control responsibility in the device based on the assignment specification;

receive control instructions from the driver and from the driver assistance system for the device; and superpose control instructions from the driver and from the driver assistance system intended for the device in accordance with the first control responsibility.

10. A motor vehicle comprising a device, wherein the device is configured to:

provide an assignment specification that specifies a first control responsibility and a second control responsibility that are assigned to a first driving situation and a second driving situation for the device respectively, wherein the first control responsibility determines that control instructions from a drive and from a driver assistance system control the motor vehicle by a first portion and a second portion respectively;

identify an instantaneous driving situation corresponding to the first driving situation while driving;

determine the first control responsibility in the device based on the assignment specification;

receive control instructions from the driver and from the driver assistance system for the device; and superpose control instructions from the driver and from the driver assistance system intended for the device in accordance with the first control responsibility.

* * * * *